United States Patent [19]

Sumi et al.

[11] Patent Number: 4,774,022

[45] Date of Patent: Sep. 27, 1988

[54] CONDUCTIVE FILM-FORMING COMPOSITION

[75] Inventors: Hideyuki Sumi, Osaka; Hiroshi Hotta, Kyoto, both of Japan

[73] Assignee: Dai-Ichi Kogyo Seiyaku Co., Kyoto, Japan

[21] Appl. No.: 45,008

[22] Filed: Apr. 30, 1987

[30] Foreign Application Priority Data

May 15, 1986 [JP] Japan ................. 61-112384

[51] Int. Cl.$^4$ ........................................... H01B 00/00
[52] U.S. Cl. ..................... 252/500; 252/518; 428/511; 428/513; 428/537.5; 524/45; 524/47; 526/295; 526/296; 526/248; 526/310
[58] Field of Search ............... 252/500; 526/295, 296, 526/248, 310; 428/511, 513, 537.5; 524/45, 47; 430/69, 270

[56] References Cited

U.S. PATENT DOCUMENTS

| | | | |
|---|---|---|---|
| 3,862,059 | 1/1975 | Greco et al. | 526/295 |
| 3,887,496 | 6/1975 | Cornier et al. | 252/500 |
| 3,978,032 | 3/1976 | Miller | 252/500 |
| 4,011,176 | 3/1977 | Saunders | 252/500 |
| 4,084,034 | 4/1978 | Jansma et al. | 252/500 |
| 4,132,674 | 1/1979 | Hwang | 252/500 |
| 4,222,901 | 9/1980 | Sinkovitz | 252/500 |
| 4,225,445 | 9/1980 | Dixon | 526/295 |
| 4,282,118 | 8/1981 | Hwang | 252/500 |
| 4,379,822 | 4/1983 | Shaw | 252/500 |
| 4,645,717 | 2/1987 | Berbeco | 252/500 |

*Primary Examiner*—Josephine Barr
*Attorney, Agent, or Firm*—Jordan and Hamburg

[57] ABSTRACT

A conductive film-forming composition for use in the manufacture of electrostatic recording paper is provided. This composition comprises a copolymer of a diallylammonium halide derivative with a N-vinylacetamide derivative as an essential component. The conductive paper manufactured by coating or impregnating a substrate paper with this composition is of remarkably high practical value in terms of electrical conductivity, hardness, surface tackiness and solvent resistance.

9 Claims, No Drawings

CONDUCTIVE FILM-FORMING COMPOSITION

BACKGROUND OF THE INVENTION

1. Field of the Invention

The present invention relates to a conductive film-forming composition and more particularly to a conductive film-forming composition for use in the production of electrostatic recording paper.

2. Description of the Prior Art

It is a known technology to form an electrically conductive layer on electrostatic recording medium paper by impregnating the substrate paper or coating either side or both sides thereof with a conductive polymer.

Such conductive polymer includes, among others, polystyrene type cationic polymers such as polyvinylbenzyltrimethylammonium chloride, etc., heterocycle-containing cationic polymers such as polydimethyldiallylammonium chloride, etc., and polyacrylic ester and amide type cationic polymers such as polymethacryloyloxyethyltrimethylammonium chloride and so on.

However, when the conventional conductive polymers or compositions based on such polymers are applied to the formation of a conductive layer, the following problems are encountered.

(1) In regard to polystyrene type cationic polymers, because of their poor solvent resistance and high cured hardness, the paper coated therewith tends to curl and the treated paper becomes too hard. Furthermore, the conductivity of the treated paper is insufficient under low humidity conditions.

(2) With heterocyclic type cationic polymers, the treated paper becomes tacky and tends to cause blocking.

(3) With polyacrylic ester and amide type cationic polymers, the electrical conductivity of the treated paper is low.

Thus, none of the prior art conductive polymers meet all the requirements of a conductive film-forming material.

OBJECTS OF THE INVENTION

The object of the present invention is to provide a conductive film-forming composition having the following characteristics.

(1) The conductive polymer itself is rich in flexibility and does not cause curling of paper. Moreover, the treated paper has a high solvent resistance.

(2) The coated paper is free of tackiness and does not cause the blocking problem even under high-humidity conditions.

(3) The polymer offers an excellent electrical conductivity at low humidity with a minimum of change in conductivity due to change in humidity.

SUMMARY OF THE INVENTION

The above-mentioned object is accomplished by the use of the conductive film-forming composition of the present invention, which composition is based on a copolymer obtainable by copolymerizing at least one species of the monomer having the following general formula (A) with at least one species of the monomer having the following general formula (B) in a molar (A)/(B) ratio of 99/1 to 50/50.

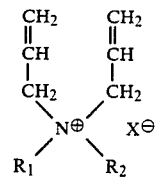

wherein $R_1$ and $R_2$ each means a hydrogen atom or an alkyl group containing 1 to 4 carbon atoms; and $X^{\ominus}$ means a halide ion.

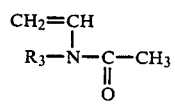

wherein $R_3$ means a hydrogen atom or an alkyl group containing 1 to 4 carbon atoms.

DETAILED DESCRIPTION OF THE PREFERRED EMBODIMENTS

The copolymer to be used in the conductive film-forming composition according to the invention can be produced by copolymerizing at least one species of the monomer having the above general formula (A) with at least one species of the monomer having the general formula (B) also above-shown.

As exemplary species of said monomer (A), there may be mentioned diallylammonium halides, methyldiallylammonium halides, dimethyldiallylammonium halides, diethyldiallylammonium halides, dibutyldiallylammonium halides and so on. The ion $X^{\ominus}$ is a halide ion such as F, Cl, Br, etc., and from the standpoints of economy, ease of production, solubility in water, etc., Cl and Br are preferred, though the invention is not limited to these species.

As exemplary species of said monomer (B), there may be mentioned N-vinylacetamide, N-vinyl-N-methylacetamide, N-vinyl-N-ethylacetamide, N-vinyl-N-butylacetamide and so on.

The above-mentioned monomers (A) and (B) can be copolymerized by the known polymerization procedures, for example by means of heat, light or UV in water or an organic solvent which is capable of dissolving both monomers (A) and (B) or in the absence of a solvent, using an azo and/or peroxide type initiator. If necessary, a chain transfer reagent may also be used.

However, in view of the form in which the conductive film-forming composition is put to use, the copolymerization reaction is preferably conducted in aqueous solution by means of heat, light or UV.

In copolymerizing monomer (A) with monomer (B), the molar (A)/(B) ratio may be within the range of 99/1 through 50/50 and preferably 95/5 through 60/40.

The mode of copolymerization of the copolymer may be any of random, block and graft polymerization.

There are no particular limits to the viscosity of the copolymer but in consideration of the fact that the composition is generally applied in solution to the substrate paperstock, the preferred range assuming that the concentration is 30% is about 10 cps to about 1000 cps and preferably about 15 cps to about 200 cps at 25° C.

The conductive film-forming composition according to the present invention may be supplemented with a variety of auxiliary agents in suitable proportions according to the intended use or object. When the composition is to be used for the production of electrostatic recording paper, for instance, one may add water-soluble polymers such as carboxymethylcellulose (CMC), starch, etc. for the purpose of improving the solvent resistance of the product and/or other inorganic or organic fillers, colorants and so on.

When an electrostatic recording paper is manufactured using the conductive film-forming composition of the invention, the following highly beneficial results are obtained.

(1) Because the copolymer as such in the composition is highly flexible, the treated paper does not curl and the solvent resistance of the treated paper is high. Moreover, compared with conductive polymers prepared by modification of high molecular weight substances, the odor and coloration due to impurities or unreacted starting materials are substantially inhibited so that not only the working environment in the conductive paper manufacturing plant is improved but the degree of whiteness of the treated paper is increased.

(2) The treated paper is not tacky so that the problem of blocking does not occur even under high humidity conditions.

(3) The treated paper shows excellent electrical conductivity under low humidity conditions and does not show any remarkable variation in conductivity due to change in humidity so that images can be obtained stably over a broad range of humidity conditions.

The following examples and comparative examples are merely intended to illustrate the invention in further detail and should not be construed as limiting the scope of the invention.

EXAMPLES 1 to 4

In deionized water were dissolved dimethyldiallylammonium chloride as monomer (A), N-vinyl-N-methylacetamide as monomer (B), and isopropyl alcohol (IPA) as the chain transfer reagent in the proportions shown in Table 1, followed by addition of 0.5 weight part of ammonium persulfate as the initiator. The polymerization reaction was carried out under a nitrogen stream at 60° C. for 4 hours, after which the reaction mixture was aged at 80° C. for 2 hours to carry the polymerization to completion. The procedure yielded an aqueous copolymer solution. Using a roll coater, this aqueous solution (30% concentration) was coated on one side of paper at the coverage of 2 g/m² and dried to give a conductive paper. This conductive paper was evaluated for surface properties. The results are shown in Table 1.

COMPARATIVE EXAMPLES 1 and 2

Using polyvinylbenzyltrimethylammonium chloride and polydimethyldiallylammonium chloride, both of which are commonly used as conductive-film forming polymers, conductive papers were manufactured in otherwise the same manner as Examples 1 to 4. These conductive papers were evaluated for surface properties. The results are shown in Table 1.

TABLE 1

| | Item | | | | | Surface properties | | | | |
|---|---|---|---|---|---|---|---|---|---|---|
| No. | Monomer (A) Dimethyldiallylammonium chloride (weight parts) | Monomer (B) N—Vinyl-N—methylacetamide (weight parts) | Monomer (A)/ monomer (B) (molar ratio) | IPA (weight parts) | Viscosity of a 30% aqueous solution of copolymer at 25° C. (cps) | Relative humidity and surface resistance | | Hardness | Tackiness | Solvent resistance |
| | | | | | | 40% RH (Ω) | 60% RH (Ω) | | | |
| Example 1 | 28.1 | 1.9 | 90/10 | 5 | 125 | $3.0 \times 10^7$ | $3.8 \times 10^6$ | ◉ | ι | ο |
| Example 2 | 26 | 4.0 | 80/20 | 10 | 42 | $3.0 \times 10^7$ | $3.9 \times 10^6$ | ◉ | ο | ◉ |
| Example 3 | 23.8 | 6.2 | 70/30 | 20 | 18 | $2.8 \times 10^7$ | $3.9 \times 10^6$ | ◉ | ◉ | ◉ |
| Example 4 | 22.4 | 7.6 | 60/40 | 20 | 17 | $2.8 \times 10^7$ | $4.0 \times 10^6$ | ◉ | ◉ | ◉ |
| Comparative Example 1 | Polyvinylbenzyltrimethylammonium chloride | | | | | $3.5 \times 10^7$ | $2.0 \times 10^6$ | x | Δ | x |
| Comparative Example 2 | Polydimethyldiallylammonium chloride | | | | | $4.0 \times 10^7$ | $2.5 \times 10^6$ | ο | x | Δ |

For measurement of the surface resistance of each conductive paper, the test conductive paper sample was allowed to remain in an atmosphere of predetermined humidity at 20° C. for 24 hours and its surface resistance was then measured with a ultra-megohmmeter (Model SM-10E manufactured by Toa Electronics Ltd.) at the measuring voltage of 10V.

For assessment of the hardness of each conductive paper, the test conductive paper sample was allowed to remain at 20° C. in an atmosphere of R.H. 11% for 24 hours and its hardness was evaluated on the basis of the degree of curling. The ◉ mark represents a sample which showed no curling; the x mark represents a sample which showed complete curling; and the o mark represents a sample which showed an intermediate degree of curling.

For assessment of the tackiness of each conductive paper, the test sample was allowed to remain in an atmosphere of 85% R.H. and its surface tackiness was evaluated by feeling the surface of the sample by finger. The ◉ mark represents a sample which showed no tackiness, the x mark represents a sample which adhered to the finger, the marks o represents a sample which showed an intermediate degree of tackiness closer to ◉, and the x mark represents a sample which showed an intermediate degree of tackiness closer to x.

For assessment of the solvent resistance of each conductive paper, one side of the test sample was contacted with toluene for 10 seconds and after the excess toluene was wiped off, the solvent resistance was evaluated on the basis of the degree of penetration of the solvent toward the other side of the conductive paper. The mark represents a sample which showed no penetration of toluene at all, the x mark represents a sample which showed a complete strike-through of toluene on the whole opposite surface, the o mark represents a sample which showed an intermediate degree of penetration closer to ◉, and the Δ mark represents a sample showed an intermediate degree of penetration closer to x.

EXAMPLES 5 to 8

Using diethyldiallylammonium chloride as monomer (A) and N-vinylacetamide as monomer (B), conductive papers were manufactured in otherwise the same manner as Examples 1 to 4. These conductive papers were also evaluated for surface properties in the same manner as Examples 1 to 4. The results are shown in Table 2.

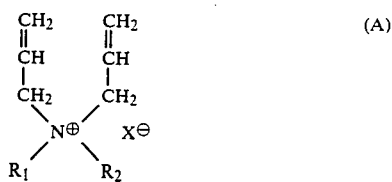

TABLE 2

| | Item | | | | | Surface properties | | | | |
|---|---|---|---|---|---|---|---|---|---|---|
| | Monomer (A) Diethyldiallylammonium chloride (weight parts) | Monomer (B) N—Vinylacetamide (weight parts) | Monomer (A)/ monomer (B) (molar ratio) | IPA (weight parts) | Viscosity of a 30% aqueous solution of copolymer at 25° C. (cps) | Relative humidity and surface resistance | | Hardness | Tackiness | Solvent resistance |
| No. | | | | | | 40% RH ($\Omega$) | 60% RH ($\Omega$) | | | |
| Example 5 | 28.6 | 1.4 | 90/10 | 10 | 41 | $3.2 \times 10^7$ | $3.5 \times 10^6$ | ⊚ | ○ | ○ |
| Example 6 | 26.4 | 3.6 | 77/23 | 20 | 15 | $3.0 \times 10^7$ | $3.3 \times 10^6$ | ⊚ | ○ | ⊚ |
| Example 7 | 24.2 | 5.8 | 65/35 | 12 | 21 | $2.8 \times 10^7$ | $3.0 \times 10^6$ | ⊚ | ⊚ | ⊚ |
| Example 8 | 23.5 | 6.5 | 62/38 | 8 | 86 | $3.1 \times 10^7$ | $3.4 \times 10^6$ | ⊚ | ⊚ | ⊚ |

EXAMPLES 9 to 12

In the same manner as Examples 1 to 4, dimethyldiallylammonium bromide as monomer (A) and N-vinylacetamide as monomer (B) were used to manufacture conductive papers. The surface properties of these papers were evaluated also in the same manner as Examples 1 to 4. The results are shown in Table 3.

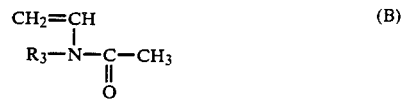

TABLE 3

| | Item | | | | | Surface properties | | | | |
|---|---|---|---|---|---|---|---|---|---|---|
| | Monomer (A) Dimethyldiallylammonium bromide (weight parts) | Monomer (B) N—Vinylacetamide (weight parts) | Monomer (A)/ monomer (B) (molar ratio) | IPA (weight parts) | Viscosity of a 30% aqueous solution of copolymer at 25° C. (cps) | Relative humidity and surface resistance | | Hardness | Tackiness | Solvent resistance |
| No. | | | | | | 40% RH ($\Omega$) | 60% RH ($\Omega$) | | | |
| Example 9 | 28.9 | 1.1 | 90/10 | 3 | 83 | $3.1 \times 10^7$ | $4.1 \times 10^6$ | ⊚ | ○ | ○ |
| Example 10 | 27.6 | 2.4 | 80/20 | 5 | 56 | $3.0 \times 10^7$ | $4.0 \times 10^6$ | ⊚ | ⊚ | ⊚ |
| Example 11 | 26.1 | 3.8 | 70/30 | 10 | 35 | $3.0 \times 10^7$ | $3.8 \times 10^6$ | ⊚ | ⊚ | ⊚ |
| Example 12 | 24.5 | 5.5 | 60/40 | 10 | 27 | $3.3 \times 10^7$ | $4.0 \times 10^6$ | ⊚ | ⊚ | ⊚ |

It will be apparent from Tables 1, 2, and 3 that the conductive papers according to Examples 1 to 12 are not only excellent in conductivity under low humidity conditions but also minimal in variation in conductivity due to change in humidity. In regard to hardness, lack of tackiness, and solvent resistance, too, these conductive papers are of high practical value.

In contrast, the conductive papers according to Comparative Examples showed marked changes in conductivity due to change in humidity. Furthermore, the conductive paper according to Comparative Example 1 is of no practical value in terms of hardness and solvent resistance and the conductive paper according to Comparative Example 2 is not of practical value in respect of tackiness.

It should be understood that while the conductive papers of Examples 1 to 12 were manufactured by coating one side of paper with the conductive film-forming composition of the invention, the composition may be applied to both sides of paper or may be used to impregnate the paper.

What is claimed is:

1. A conductive film-forming composition consisting essentially of a copolymer obtainable by copolymerizing at least one species of the monomer of general formula (A) with at least one species of the monomer of general formula (B) in a molar (A)/(B) ratio of 99/1 through 50/50.

wherein $R_1$ and $R_2$ each means a hydrogen atom or an alkyl group containing 1 to 4 carbon atoms; and $X^\ominus$ means a halide ion, wherein $R_3$ means a hydrogen atom or an alkyl group containing 1 to 4 carbon atoms.

2. A conductive film-forming composition according to claim 1 wherein said monomer of general formula (A) is at least one member selected from the group consisting of diallylammonium halides, methyldiallylammonium halides, dimethyldiallylammonium halides, diethyldiallylammonium halides and dibutyldiallylammonium halides.

3. A conductive film-forming composition according to claim 1 wherein said monomer of general formula (B) is at least one member selected from the group consisting of N-vinylacetamide, N-vinyl-N-methylacetamide, N-vinyl-N-ethylacetamide and N-vinyl-N-butylacetamide.

4. A conductive film-forming composition according to claim 1 wherein the molar ratio of monomer (A) to monomer (B) is 95/5 through 60/40.

5. An electrostatic recording medium comprising a paper sheet coated with a copolymer obtainable by copolymerizing at least one species of the monomer of general formula (A) with at least one species of the monomer of general formula (B) in a molar (A)/(B) ratio of 99/1 through 50/50,

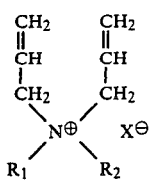

(A)

wherein $R_1$ and $R_2$ each means a hydrogen atom or an alkyl group containing 1 to 4 carbon atoms; and $X^\ominus$ means a halide ion,

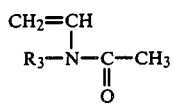

(B)

wherein $R_3$ means a hydrogen atom or an alkyl group containing 1 to 4 carbon atoms.

6. A conductive film-forming composition comprising a copolymer and at least one auxiliary agent, said copolymer being obtainable by copolymerizing at least one species of the monomer of general formula (A) with at least one species of the monomer of general formula (B) in a molar (A)/(B) ratio of 99/1 through 50/50,

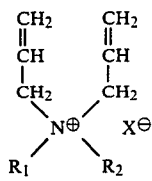

(A)

wherein $R_1$ and $R_2$ each means a hydrogen atom or an alkyl group containing 1 to 4 carbon atoms; and $X^\ominus$ means a halide ion,

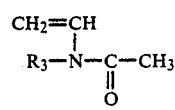

(B)

wherein $R_3$ means a hydrogen atom or an alkyl group containing 1 to 4 carbon atoms.

7. A conductive film-forming composition according to claim 6 wherein said auxiliary agent is at least one member selected from a group consisting of water-soluble polymers, inorganic fillers, organic fillers, and colorants.

8. A conductive film-forming composition according to claim 6 wherein said water-soluble polymer is at least one member selected from the group consisting of carboxymethylcellulose and starch.

9. A conductive film-forming composition according to claim 6 wherein said composition is in aqueous solution.

* * * * *